Nov. 6, 1951           I. H. POLK           2,573,725
TUNNEL FREEZING APPARATUS AND METHOD
Filed Aug. 21, 1946           4 Sheets-Sheet 1
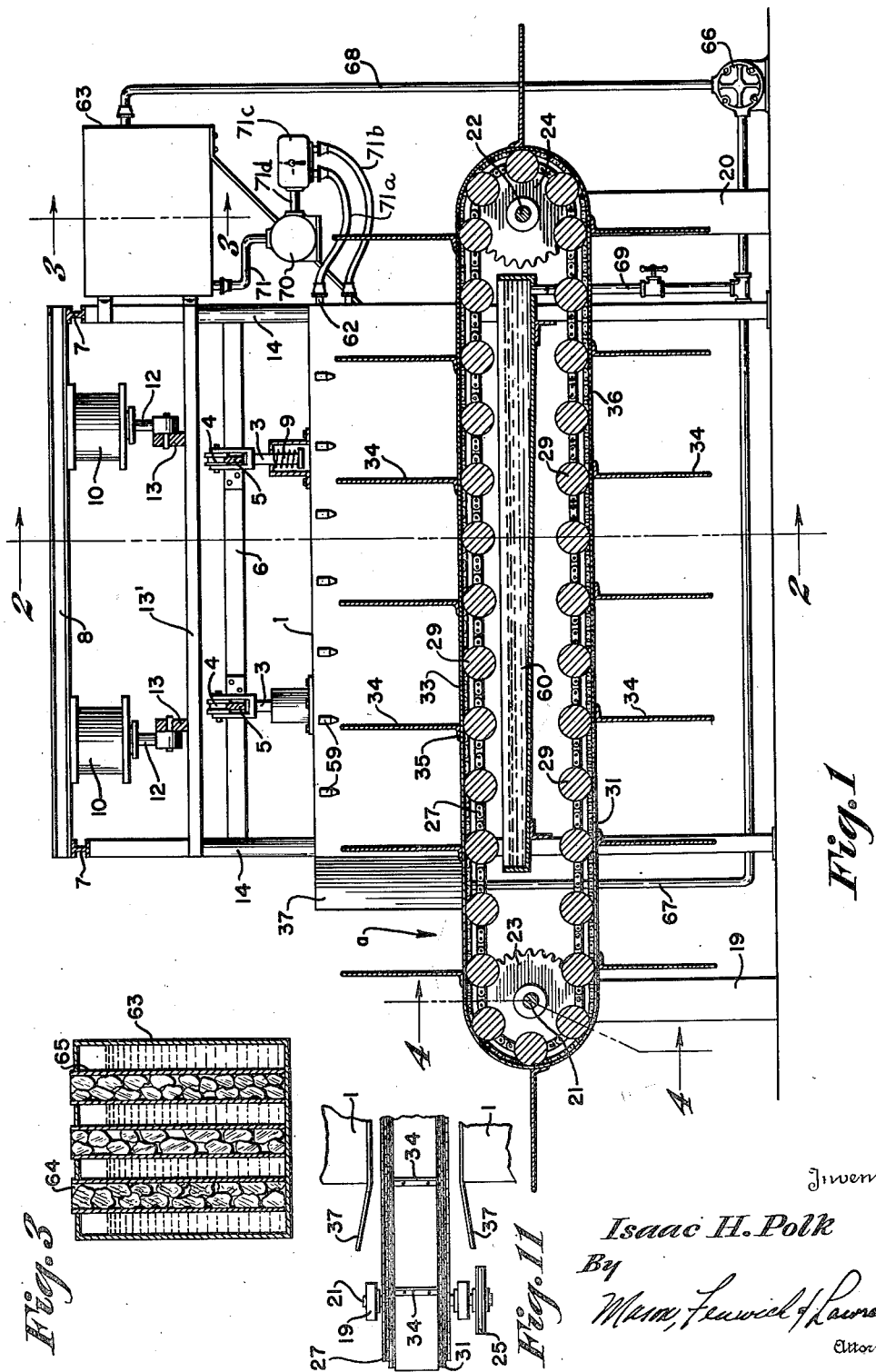
Inventor
Isaac H. Polk
By
Attorneys Nov. 6, 1951      I. H. POLK      2,573,725
TUNNEL FREEZING APPARATUS AND METHOD
Filed Aug. 21, 1946      4 Sheets-Sheet 2
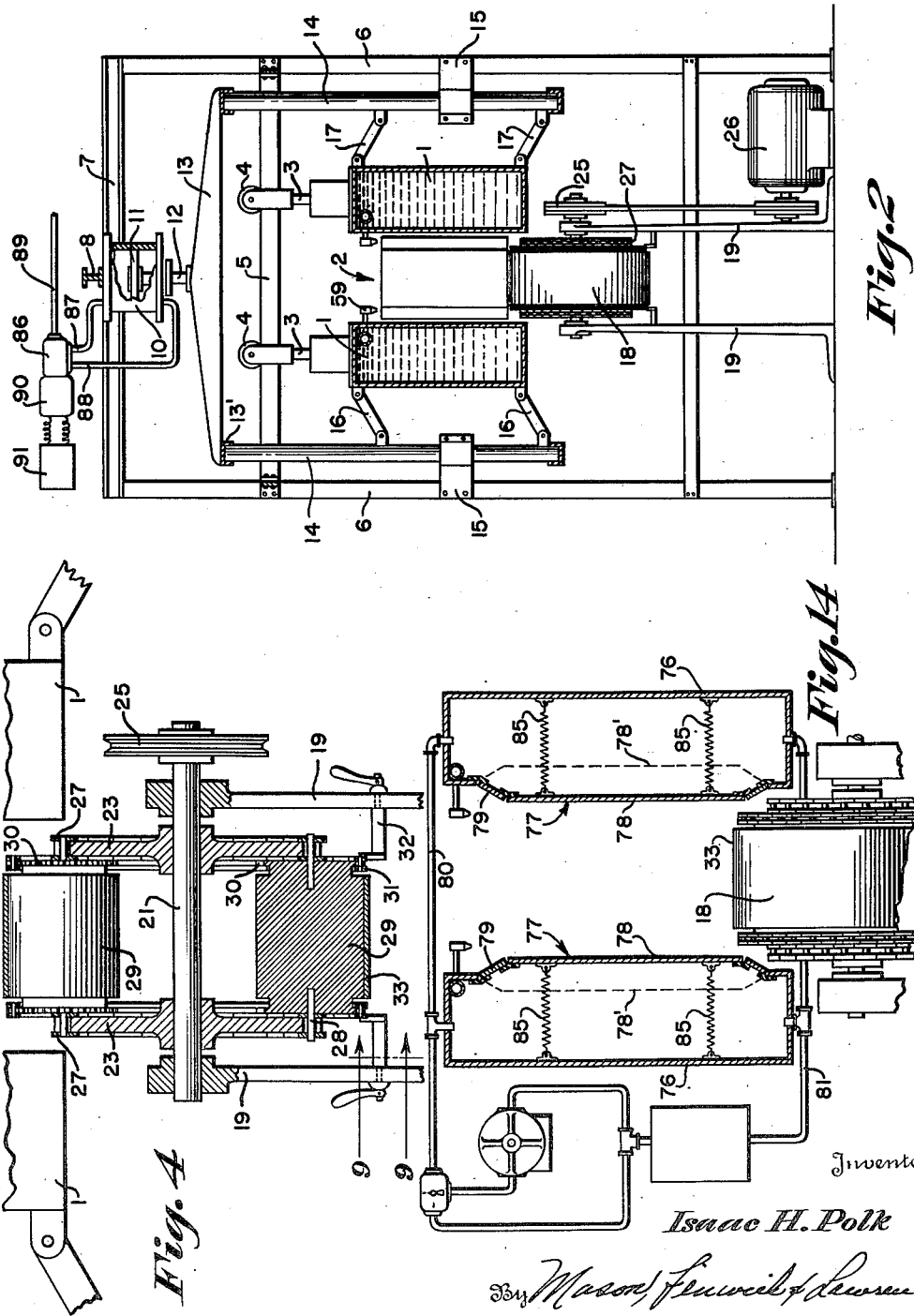
Inventor
Isaac H. Polk
By Mason, Fenwick & Lawrence
Attorneys Nov. 6, 1951   I. H. POLK   2,573,725
TUNNEL FREEZING APPARATUS AND METHOD
Filed Aug. 21, 1946   4 Sheets-Sheet 3
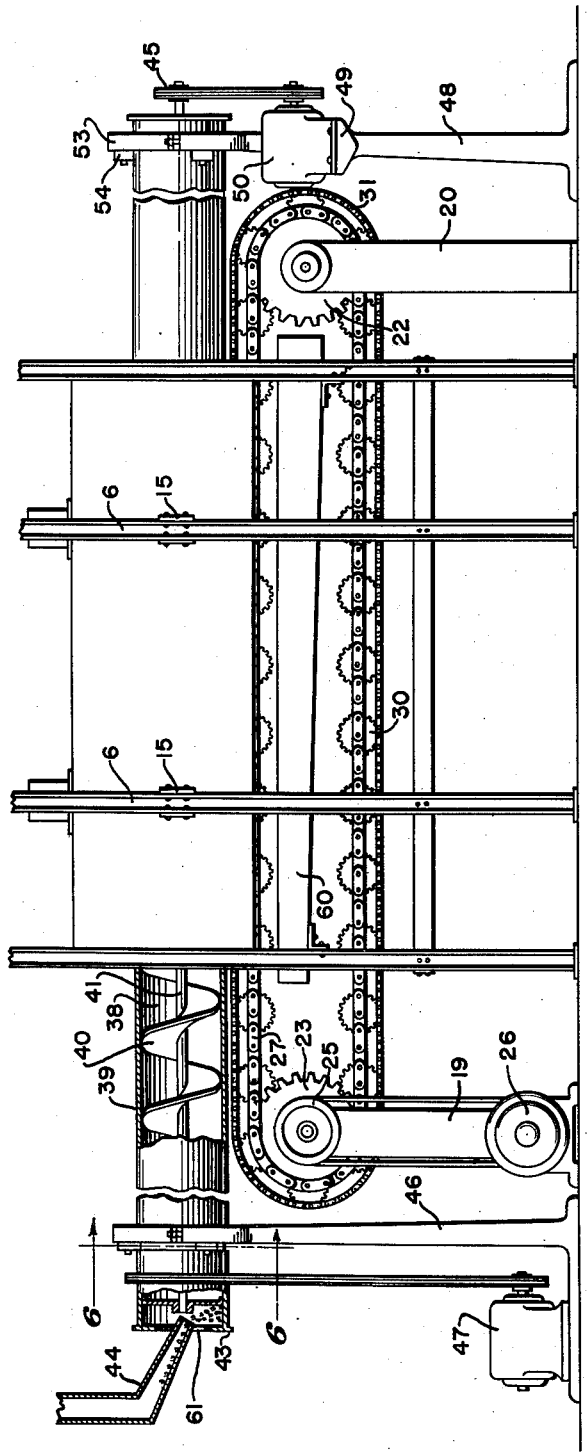
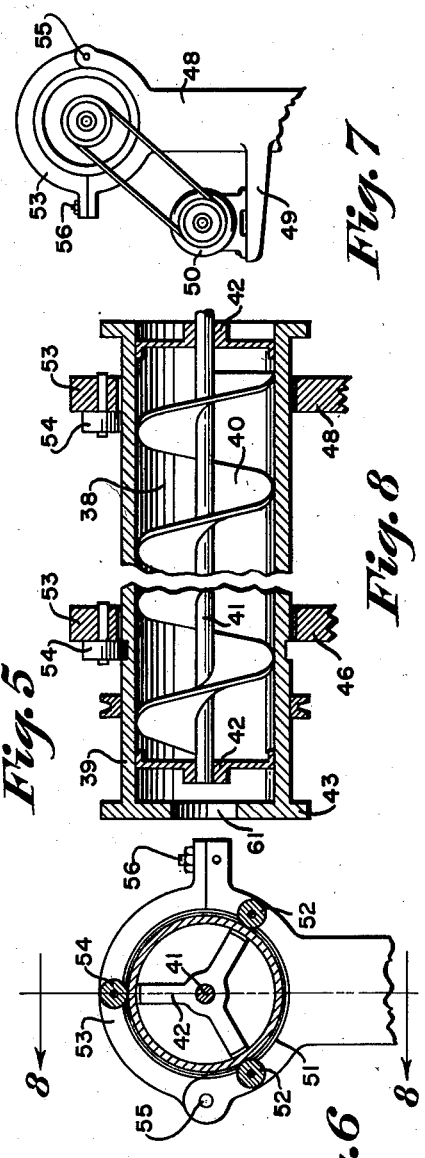
Inventor
Isaac H. Polk
By
Marx, Fenwick & Lawrence
Attorneys

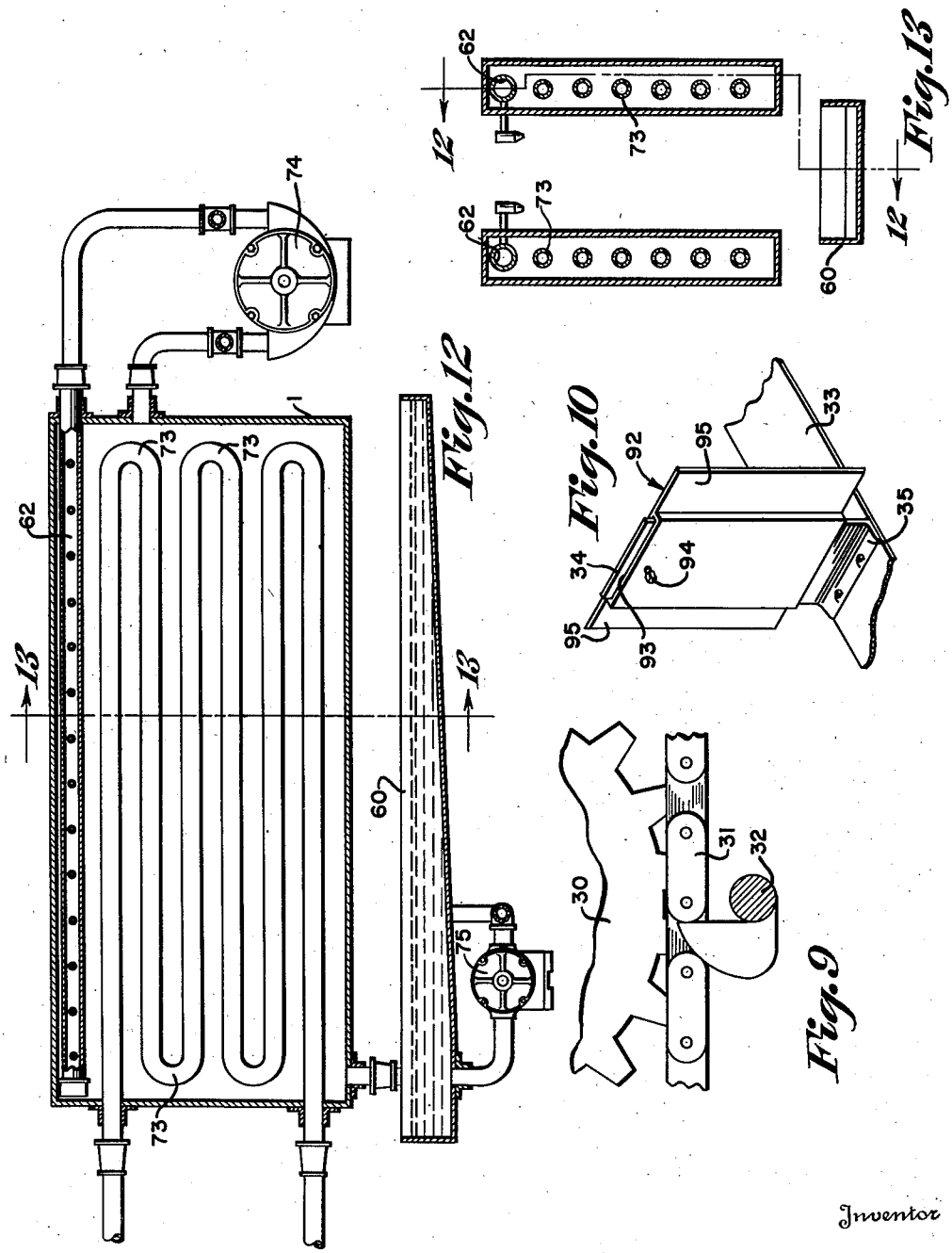

Patented Nov. 6, 1951

2,573,725

UNITED STATES PATENT OFFICE 2,573,725

TUNNEL FREEZING APPARATUS AND METHOD

Isaac H. Polk, San Jose, Calif.

Application August 21, 1946, Serial No. 691,962

17 Claims. (Cl. 62—114)

This invention relates to apparatus for the sharp freezing of commodities, usually foodstuffs. Conventional methods of sharp freezing depend upon the character of the package or the nature of the product to be frozen. Food in pervious wrappers, such as paper, cannot be frozen practically by a brine spray, due to the risk of penetration of the wrapper by the brine. Therefore, pervious packages are generally frozen by conduction in a refrigerated atmosphere. A canned product is usually frozen by impinging a brine spray directly upon the cans while the latter are in rolling motion. Some free flowing products, such as peas, are most expeditiously frozen before packaging by conveying them through a revolving cylinder, the outer surface of which is sprayed with brine.

One of the objects of the present invention is to provide a freezing tunnel or passage in which any one of the above methods may be selectively carried out, the product being frozen while being within said tunnel or passage, the change from one method to another being accomplished simply by making certain shifts or adjustments.

Another object of the invention is the provision of a freezing tunnel or passage having refrigerated side walls relatively movable widthwise of the tunnel, whereby the tunnnel sides may be brought into contact with the flat opposite sides of packages so shaped, permitting direct conduction between the product and the refrigerated walls of the tunnel, without the interposition of atmosphere in the conductive path.

A further object of the invention is to provide a freezing tunnel having refrigerated side walls adjustable widthwise of the tunnel, whereby the width of the tunnel may be selectively varied, and having brine spray heads associated with said side walls, adapting the tunnel to freezing by direct conduction or by brine spray, or by both methods of freezing combined.

Another object of the invention is to provide sharp freezing apparatus as described, comprising fundamentally the freezing tunnel with refrigerated widthwise adjustable side walls and spray heads, having a duplex conveyor therethrough with alternatively operable flights, one for conveying flat sided packages, and the other for conveying cans and rotating them while they are in passage through the tunnel.

Still another object of the invention is the provision in freezing apparatus as described, of means for rotatably supporting a freezing tube extending through the tunnel, alternatively operable with respect to the duplex conveyor, for freezing a free flowing unpackaged product.

Another object of the invention related particularly to the freezing of pervious packages with which the side walls of the freezing tunnel make surface contact, is to provide combined sidewise and vertical movements of the side walls of the tunnel, for breaking frost adhesions between the side walls and the packages.

Other objects of the invention will appear as the following description of an illustrative embodiment of the invention proceeds.

In the drawings which accompany and form a part of the following specification and throughout the several figures of which the same reference characters have been employed to denote identical parts:

Figure 1 is a side elevation, partly in section, of apparatus embodying the principles of the invention;

Figure 2 is a cross-section taken along the line 2—2 of Figure 1;

Figure 3 is a cross-section taken along the line 3—3 of Figure 1;

Figure 4 is a cross-section taken along the line 4—4 of Figure 1;

Figure 5 is a side elevation, partly in section, of the apparatus illustrated in Figure 1, showing the auxiliary apparatus employed for freezing free flowing unpackaged product;

Figure 6 is a cross-section taken along the line 6—6 of Figure 5;

Figure 7 is an end elevation of the upper portion of the rear freezing tube standard, showing the motor drive to the freezing tube conveyor;

Figure 8 is a vertical longitudinal section through the freezing tube, the intermediate portion being broken out;

Figure 9 is a fragmentary side view showing the latch which engages the drive chains for the rollers of the can conveyor;

Figure 10 is a perspective view showing a portion of the belt conveyor, with the removable scraper blade unit on one of the vanes;

Figure 11 is a fragmentary plan view of the forward end of the freezing tunnel, showing the flaring lips;

Figure 12 is a longitudinal vertical section showing diagrammatically a system in which the brine is refrigerated within the tunnel side walls;

Figure 13 is a cross-section taken along the line 13—13 of Figure 12;

Figure 14 is a view in cross-section, showing a modified form of movable tunnel side walls.

Referring now in detail to the several figures, and first adverting to the group of Figures 1 to 11, inclusive, the numeral 1 represents the chambered boxes which constitute the refrigerated side walls of the freezing tunnel or passage 2. These are suspended from hangers 3, carrying rollers 4, which travel upon transverse tracks 5, supported by the upright side members 6 of a frame which includes the cross beams 7 at the top and a longitudinal tie beam 8 extending medially over the transverse beam. There is a spring link 9 interposed between the side walls 1 and hangers 3, so that said side walls are capable of vertical movement relative to the hangers, as well as transverse movement with the hangers permitted by the mobile relation of the hangers to the transverse tracks 5. The tracks 5 and suspending means are duplicated at spaced points between the ends of the tunnel.

Fluid pressure motors 10, which may be pneumatically or hydraulically operated are mounted on the beam 8. These include a piston 11 and piston rod 12, and are double acting. From the lower end of each piston rod a transverse yoke 13 is pivotally mounted on a horizontal axis. The ends of the yokes terminate adjacent the frame members 6 and support longitudinal beams 13'. Parallel guide bars 14 extend downwardly from the ends of the beams 13', slidably reciprocable in guideways formed in the clips 15 secured to the frame members 6. Pivoted parallel links 16 and 17 join the guide bars to the respective tunnel side walls 1. These links are so arranged as always to be inclined oblique with respect to the guide bars and side walls. When the guide bars move up under the bias of fluid pressure admitted to the under side of the piston 11, the links 16 and 17 move toward a position of perpendicularity with respect to the guide bars, pushing the side walls 1 toward one another, narrowing the width of the tunnel. When the guide bars move down on the reverse pressure stroke of the piston the links swing toward the respective guide bars, drawing the side walls 1 apart to widen the freezing tunnel.

The width adjustment of the tunnel is primarily for the purpose of permitting the side walls of the tunnel to be brought into intimate contact with the flat side walls of packages of product so that freezing is by direct conduction through the contacting side walls of the package and tunnel, avoiding the intervention of a layer of atmosphere, which is a relatively poor heat conductor. This mode of freezing is particularly advantageous when applied to goods packaged in pervious wrappers which cannot be practically frozen by direct brine spray due to absorption of brine by the wrapper.

When the pervious packages are first contacted by the tunnel side walls, any moisture on the surfaces of the packages will be converted into frost, tending to create a bond between the packages and side walls that may amount to enough resistance to stall the conveyor when the latter moves to discharge the frozen packages from the tunnel. Means to prevent the formation of this frost bond or to break it must be provided, and this is a function of the movements of which the side walls of the tunnel are capable.

It would not be sufficient to rely solely upon the widthwise spread of the tunnel side walls, for the packages might separate from one side wall but stick to the other. It will be noted, however, that due to the constantly inclined relation of the links 16 and 17 to the vertical plane of the guide bars 14 and side walls 1, a component of the force imposed upon the links for spreading the side walls acts to move the side walls vertically, this vertical movement being permitted by the spring link 9 in the line of suspension. The simultaneously combined lateral spreading and vertical movements of the tunnel side walls is effective to prevent or break frost adhesions at both sides of the package.

Figure 2 shows means for periodically spreading the side walls by timed reversal of the operation of the fluid pressure motors 10. A valve 86 is diametrically shown, having connections 87 and 88, with opposite sides of the motor 10, and a connection 89 to a source of fluid pressure which may be alternately brought into communication with the connections 87 and 88. The valve, as shown, is electrically actuated through the solenoid 90, the solenoid being in circuit with a timed controlled switch 91, such as the "Telechron" timer manufactured by General Electric Company.

Referring once again to Figures 1 to 11, inclusive, a duplex conveyor is shown designated as a whole by the reference character 18. This is referred to as "duplex," since it involves two endless conveyor elements, one for supporting cylindrical packages, such as cans, the other for supporting flat bottomed packages, the latter conveying element being removable to make the can conveyor accessible for use. It is important to note that the duplex conveyor extends a short distance heightwise into the freezing tunnel, as shown in Figure 2, and that the overall width of that part which lies within the sides of the tunnel is less than the minimum width to which the tunnel may be contracted, to permit the sides of the tunnel to make contact with the smallest sized packages for which it is designed.

The conveyor 18 is carried between fore and aft pairs of spaced standards 19 and 20, similar in construction and relative arrangement, located beyond the respective ends of the freezing tunnel, as shown in Figure 2. Shafts 21 and 22 are journaled in the upper ends of said standards, carrying respectively the pairs of spaced sprockets 23 and 24. The shaft 21 has a pulley 25, driven from a motor 26, shown in Figure 2. Endless chains 27 pass around these sprockets, certain links having inwardly extending pins 28, which form trunnions for rollers 29, the latter bridging the space between the chains. The rollers are so spaced as to support cylindrical cans, lying axially parallel upon them, above the chains 27.

Product in cans is frozen by direct contact of brine spray with the cans, the latter being rotated meanwhile to promote uniform quick freezing of the contents. In order to rotate the cans, the rollers 29 are provided at their ends with sprockets 30, about which pass endless chain tracks 31. These chain tracks are held fixed by the latch 32, which engages a link in each chain. As the drive chains 27 revolve, the roller sprockets 30 roll upon the fixed chain tracks 31, rotating the rollers 29 in one direction, imparting rotation to the cans supported upon said rollers.

For conveying flat sided packages through the freezing tunnel, the duplex conveyor is provided with a flat endless belt 33, seated about the rollers 29, the diameter of the rollers being such as to bring the face of the belt above the roller sprockets 30. Since it is not desirable that the rollers 29 should rotate when the belt 3 is employed, the latch 2 is releasable from the chain tracks, permitting the chain tracks to travel with the roller sprockets 30, at the same speed. Since the loading station of the conveyor is outside the freezing tunnel, vertical stacking of the packages on the conveyor is promoted by the provision of the spaced vanes 34, secured perpendicularly to the belt 33, having bracing flanges 35 at the base extending in a trailing direction. The packages are loaded on the belt between adjacent vanes 34, a convenient loading station being indicated by the arrow *a* in Figure 1. To facilitate its removal, the belt 33 is transversely separable at the point 36, the ends being secured by quick connectable means, not shown, of which there are many in the prior art. The anterior end of the freezing tunnel has the flaring lips 37, to align and guide the packages into the tunnel in the event that they may be carelessly placed upon the conveyor belt. These lips are forward extensions of the inner faces of the respective side walls 1, and move with said side walls.

Since accumulation of frost on the tunnel walls is objectionable because of its heat insulating effect, means are provided for its removal, consisting of detachable scraper blade units 92, with which some or all of the vanes 34 may be equipped, said units being selected according to the width of the packages to be frozen, so that the edges of said blades make contact with the sides of the freezing tunnel, irrespective of its width. Figure 10 shows that the scraper blade unit 92 comprises a middle socket 93, adapted to slip over the vane 34 and be secured by a set screw 94, and having the lateral resilient blades 95. Since the vanes 34 are narrower than the minimum width to which the tunnel may be adjusted, there is room for the blades to yield resiliently when moved against the surfaces of the side walls.

Figure 5 shows the apparatus of Figure 1 with the auxiliary freezing tube extended through the freezing tunnel 38. This tube is for freezing free flowing unpackaged product. It is portable and comprises a cylindrical shell 39 of such length as to extend beyond the ends of the freezing tunnel. A screw conveyor 40 within the shell 39 forms a unitary part of the freezing tube. It includes a shaft 41 journaled in spiders 42, adjacent opposite ends of the shell 39, at the front. The shell has an annular end flange 43, defining a central hole 61 which gives access to the spout 44 of a feed hopper. The shell is open at the rear end, to provide for the discharge of the frozen product. The shaft 41 of the screw conveyor projects axially from the rear end of the shell 39, and has a drive pulley 45.

The apparatus of the subject invention comprises the forward standard 46, having an extended base on which the motor 47 is mounted, and a rearward standard 48, having the lateral shelf 49, which affords support to the motor 50. The upper ends of both standards are substantially alike. Each has a semi-circular seat 51, having antifriction rollers 52, upon which the freezing tube rests, and each has a semi-circular cap 53, with antifriction rollers 54, which close down upon the freezing tube. The caps 53 are hinged at one side, as at 55, and at the opposite side they are latched in closed position by means such as the swinging bolt 56. The standards 46 and 48 are arranged respectively in front of and back of the freezing tunnel, and are of such height as to support the freezing tube above the duplex conveyor 18.

The shell 39 has an external circumferential groove 57 near its forward end, in which the rollers 52 and 54 of the forward standard run when the freezing tube 38 is in place. This prevents the freezing tube from moving longitudinally. Forwardly of the groove 57 the shell 39 is provided with a pulley ring 58.

When it is desired to employ the freezing tube 38 for freezing free flowing unpackaged product, the caps of the standards are thrown open; the freezing tube is placed upon the antifriction rollers 52 with the forward rollers in the groove 57; the caps are then closed; the belt of motor 50 is slipped upon the pulley 45, and the belt of motor 47 slipped upon the pulley ring 50. The spout 44 of the feed hopper is then introduced into the hole 61 in the forward end of the freezing tube. All is now ready to go.

Figure 2 shows the chambered side walls 1 of the freezeing tunnel filled with brine, and spray heads 59 extending into the upper part of the tunnel from the inner faces of said side walls. There are longitudinal series of these spray heads, as shown in Figure 1, communicating with brine manifolds 62, immersed in the brine which fills the brine chambers of the side walls. Brine is sprayed downward direct upon the freezing tube when that is in place, or alternatively upon the rotating cans when the freezing tube and belt 33 are removed. The brine is caught in a pan 60, located beneath the upper flights on the duplex conveyor 18.

It is advantageous to contract the width of the freezing tunnel when using the brine spray, for not only are the spray heads 59 brought closer together concentrating the spray, but the refrigerated side walls are brought closer to the spray, maintaining its low temperature while it is in transit from the spray heads to the freezing tube or cans, as the case may be.

Various systems may be employed for refrigerating the tunnel side walls and supplying the brine spray heads. In Figure 1, a tank 63 is shown for chilling the brine. This is provided with a plurality of spaced compartments 64, adapted to be supplied with Dry Ice. The walls 65 of said compartments provide an extended conductive surface contacted by the ambient brine. The pump 66 recirculates brine between the tank 63 and the tunnel side walls 1, drawing it from the chambers of the side walls by way of the conduits 67, and delivering it to the tank by way of conduit 68. A branch pipe 69 on the induction side of the pump picks up brine from the pan 60 when the spray heads are in use. A separate pump 70 connected to tank 63 by conduit 71 circulates brine to the spray manifolds 62 and to side walls 1 through the medium of hoses 71a and 71b respectively leading from a distributor valve 71c connected to the outlet side of the pumps by pipe 71d.

Figures 12 and 13 show a variant of the invention, in which the brine is chilled within the side walls 1 by the evaporator coils 73 of a conventional refrigeration system mounted within the chambers of the side walls. The pump 74 draws chilled brine from the side walls and pours it into the spray head manifolds 62. Another pump 75 pumps brine from the pan 60 back into the chambers of the side walls. It is obvious that the pumps 74 and 75 are operated only when the spray method of freezing is being practiced. When the refrigerated side walls are employed, the brine remains static within the side walls.

Figure 14 illustrates a modified form of the invention in which the chambered side walls 1, which in the first described form of the invention are movable widthwise as a whole, are substituted by the lateral juxtaposed fixed brine tanks 76 having inner bellows walls 77 constituting the sides of the tunnel. These walls consist of planiform plates 78 joined to the adjacent fixed structure by flexible fluidtight connections, such as the rubber inserts 79. The plates 78 have a normal collapsed position, indicated at 78'. The distance between the walls when in collapsed position represents the maximum tunnel width. The walls are expanded through brine pressure within the tanks 76. A closed circulation system is diagrammatically shown, in which pressure may be developed. Numeral 79 represents a brine chiller connected in circuit with the tanks 76 by conduits 80 and 81, a pump 82 being intercalated in the circuit. There is a by-pass 83 about the pump, controlled by a regulating valve 84. Pervious packages are introduced into the tunnel upon the belt 33 and the regulating valve adjusted to develop the desired pressure to push the plates 78 against the flat sides of the packages. In the absence of the pressure, the plates 78 normally assume their collapsed position under the pull of springs 85.

To assist in breaking frost adhesions, this form of the invention does not have the factor of vertical movement which characterizes the first described form, but since frost adhesions do not generally uniformly cover the interface between the packages and the tunnel side walls, but are spotty and irregular in their surface distribution, the plates 78 which are actually floatably mounted in their flexible rubber connections tend to cant when pulled away from adherent packages under pressure of the springs when internal pressure is released, thereby progressively breaking the frost adhesions.

It will be apparent from the above disclosure that a plant equipped with the apparatus of the present invention is in a position to practice all three types of freezing, direct conduction in the case of pervious packages, spray freezing of cans while the latter are rotating, or the spray freezing of free flowing unpackaged product, the change-over from one type to another being accomplished in a few minutes time and involving no greater change than the mere removal of a belt or the placing of a portable freezing tube in the tunnel supported upon standards already installed as part of the apparatus. It is also obvious that the high freezing efficiency which stems from the ability to narrow the width of the freezing tunnel attends all three types of freezing.

In the application of the apparatus to the freezing of pervious packages, packages of irregular contour, such as meat in thin flexible wrappers, may be efficiently handled, the pressure which contracts the side walls of the tunnel being so regulated as to compress the sides of the packages on the conveyor belt into flat shape.

The apparatus of the present invention is relatively small and inexpensive and adapted to small plants, giving opportunity for the freezing of versatile products. It fits the environment of small communities and may therefore be installed close to the plant where the produce is raised, particularly in association with locker plants, ensuring freshness and avoiding long shipment to large freezing centers.

While I have in the above description disclosed a practical embodiment of the invention, it will be understood by those skilled in the art that the structural details and arrangement of parts, as shown, are illustrative and not to be construed as limiting the invention.

What I claim as my invention is:

1. In freezing apparatus for freezing packages by direct conduction, a freezing passage having refrigerated side walls, a conveyor extending along the lower part of said passage, said side walls being transversely movable whereby they may be brought into surface contact with the sides of packages on said conveyor, and means for moving said side walls simultaneously transversely and vertically for breaking frost adhesions between said packages and side walls.

2. In freezing apparatus, a freezing passage having transversely movable refrigerated side walls, spray heads carried by said side walls positioned to discharge into said passage, means for supplying refrigerant to said side walls, means for supplying refrigerated brine to said spray heads, and means for moving said side walls transversely whereby the width of said passage and the distance apart of said spray heads may be correspondingly varied.

3. In freezing apparatus, a freezing passage having transversely movable refrigerated side walls, spray heads carried by said side walls positioned to discharge into said passage, means for supplying refrigerant to said side walls, means for supplying refrigerated brine to said spray heads, a conveyor extending through said passage having a flight for conveying cans including means associated with said flight for rotating said cans while in transit through said passage, a pan under said can flight and beneath said spray heads for catching brine, and means for returning brine from said pan to the brine supply.

4. In freezing apparatus, a freezing passage having transversely movable refrigerated side walls whereby the width of said passage may be varied, spray heads carried by said movable side walls positioned to discharge into said passage, means for refrigerating said side walls, means for supplying refrigerated brine to said spray heads, a conveyor extending through said passage having a flight for conveying cans including means for rotating said cans while in transit through said passage, and a belt flight for pervious packages superposed with respect to said can flight, the belt flight being removable to give operative access to said can flight.

5. Freezing apparatus as claimed in claim 4, including spaced transverse vanes carried perpendicularly by said belt flight for positively pushing pervious packages through said passage.

6. In freezing apparatus, a freezing tunnel having transversely movable refrigerated side walls whereby the width of said tunnel may be varied, spray heads carried by said movable side walls extending into said tunnel, means for refrigerating said side walls and supplying refrigerated brine to said spray heads, a conveyor extending through said tunnel having a flight for conveying cans including means for rotating said cans while in passage through said tunnel, and a belt flight for pervious packages superposed with respect to said can flight, the belt flight being removable to give operative access to said can flight, a removable freezing tube in said tunnel above said conveyor and below said spray heads, rotatably supported, and means for rotating said freezing tube.

7. In freezing apparatus, a freezing tunnel having refrigerated walls, spray heads extending into said tunnel, means for supplying refrigerant to said walls and refrigerated brine to said spray heads, a conveyor passing through said tunnel having a flight for cans including means for rotating the cans while in passage through said tunnel, and having a belt flight for flat sided packages superposed with respect to said can flight and removable to give operative access to said can flight, supports beyond the ends of said tunnel, a rotatable freezing tube extending through said tunnel between said spray heads and conveyor removably fitted on said supports, and means for driving said conveyor and said freezing tube.

8. In freezing apparatus, a frame including transverse track members, a freezing passage comprising longitudinal spaced elongated chambered side walls, hangers suspending said side walls from said track members including resilient links whereby said side walls may move vertically relative to said frame, said hangers being independently movable along said track members whereby said side walls are transversely moved for varying the width of said passage, fluid pressure motors on said frame, a sub frame reciprocated by said fluid pressure motors comprising guide bars slidable in vertical planes parallel to said side walls, and inclined parallel pivoted linkage between said guide bars and side walls operating when said sub frame is reciprocated by said motors to move said side walls simultaneously vertically, and laterally in opposite directions.

9. In freezing apparatus, a freezing passage defined by suspended refrigerated side wall members capable of vertical movement and relative lateral movement in opposite directions, a conveyor extending along the lower part of said passage between said side walls, and means for moving said side walls simultaneously vertically and laterally.

10. In freezing apparatus, side by side laterally spaced chambered members each having an inner bellows wall constituted by a flat plate flexibly connected in fluidtight manner perimetrically to the surrounding structure of the respective chambered members, said plates defining between them a freezing passage, a conveyor for flat sided packages extending through said passage between said plates, means for conducting refrigerant to said chambered members and means for developing internal pressure against said side walls for pressing them against the sides of packages carried by said conveyor.

11. In freezing apparatus, a freezing passage having chambered brine filled side walls laterally movable whereby the width of said passage may be varied, and evaporator coils of a refrigeration system within said side walls for refrigerating the brine contained therein.

12. In freezing apparatus, a freezing passage having chambered brine filled side walls laterally movable whereby the width of said tunnel may be varied, series of spray heads mounted to discharge into said passage, manifolds within said side walls with which said spray heads communicate, a pump for pumping brine from the chambers of said side walls to said manifolds, a pan beneath said passage for catching brine from said spray heads, means for returning brine from said pan to the chambers of said side walls, and evaporator coils of a refrigeration system within the chambers of said side walls for refrigerating said brine.

13. In freezing apparatus for freezing by direct conduction, flat sided packages of different widths, a freezing passage having refrigerated side walls movable in a transverse direction to adjust the width of the passage to the width of the packages, a conveyor extending longitudinally of said passage forming the bottom thereof, for bringing packages into and discharging them from said passage, and means for moving said side walls laterally away from said packages in said passage and producing relative vertical movement between said packages and side walls for breaking frost adhesions between said packages and side walls.

14. In freezing apparatus for freezing flat-sided packages by direct conduction, a freezing passage having opposed substantially vertically disposed refrigerated side walls between which the packages are received for freezing, said walls being movable in a transverse direction to adjust the width of the tunnel to the width of the packages, a support for packages located along the lower edges of said walls, and means for moving said side walls laterally away from said packages and for producing relative vertical movement between said support and the packages thereon and said walls for breaking adhesions between the packages and walls.

15. In a method of removing flat-sided packages from refrigerated walls between which the packages have been frozen by direct conduction, the steps of supporting the packages against movement in a region along one margin of said walls, and moving said walls laterally away from said packages and toward the region of support to produce a shearing action between the walls and the packages.

16. In apparatus for freezing articles, the combination of a pair of opposed refrigerated plates mounted for lateral movement into engagement with opposite surfaces of an article to be frozen, and for movement in a plane substantially normal to the plane of said first named movement, and abutment means arranged to prevent movement of said article in the direction of the last named movement of said plates.

17. Article freezing apparatus comprising, in combination, a pair of spaced refrigerated plates mounted for relative movement into engagement with opposite surfaces of said article, abutment means between said plates disposed to support said article, said abutment means being independent of said plates, and means for breaking ice adhesion of said article to said plates comprising actuating means operative to cause simultaneous relative shearing and separative movements as between both said plates and said article supported by said abutment.

ISAAC H. POLK.

REFERENCES CITED

The following references are of record in the file of this patent:

UNITED STATES PATENTS

| Number | Name | Date |
|---|---|---|
| 1,802,369 | Birdseye | Apr. 28, 1931 |
| 1,822,089 | Hall | Sept. 8, 1931 |
| 1,998,431 | Birdseye | Apr. 23, 1935 |
| 2,231,012 | Kleist | Feb. 11, 1941 |
| 2,247,865 | Zarutschenzeff | July 1, 1941 |
| 2,268,551 | McMahon | Jan. 6, 1942 |
| 2,280,133 | Sunbach | Apr. 21, 1942 |
| 2,329,226 | Stafford | Sept. 14, 1943 |
| 2,335,618 | Thompson | Nov. 30, 1943 |
| 2,418,746 | Bartlett | Apr. 8, 1947 |